(12) United States Patent
Khojastepour et al.

(10) Patent No.: US 11,120,233 B2
(45) Date of Patent: Sep. 14, 2021

(54) SIGNATURE-BASED RFID LOCALIZATION

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation

( * ) Notice: Subject to any disclaimer, the term of this patent is extended or adjusted under 35 U.S.C. 154(b) by 48 days.

(21) Appl. No.: 16/376,039

(22) Filed: Apr. 5, 2019

(65) Prior Publication Data

US 2019/0311162 A1 Oct. 10, 2019

Related U.S. Application Data

(60) Provisional application No. 62/655,153, filed on Apr. 9, 2018.

(51) Int. Cl.
*G01S 7/00* (2006.01)
*G06K 7/10* (2006.01)

(52) U.S. Cl.
CPC ..... *G06K 7/10099* (2013.01); *G06K 7/10069* (2013.01)

(58) Field of Classification Search
CPC .................................................. G06K 7/10099
See application file for complete search history.

(56) References Cited

U.S. PATENT DOCUMENTS

| 2006/0022800 A1* | 2/2006 | Krishna | G06K 17/0029 340/10.2 |
| 2013/0147608 A1* | 6/2013 | Sadr | H03M 13/2957 340/10.1 |
| 2016/0092708 A1* | 3/2016 | Burns | G01S 11/02 340/10.1 |
| 2018/0074159 A1* | 3/2018 | Mullessary | G01S 13/84 |

\* cited by examiner

*Primary Examiner* — Qutbuddin Ghulamali
(74) *Attorney, Agent, or Firm* — Joseph Kolodka

(57) ABSTRACT

A Radio Frequency Identification (RFID) localization system is provided. The system includes a set of passive RFID tags, each for reflecting transmitted signals. The system further includes an RFID reader for detecting the reflected signals by the passive RFID tags. The system also includes a processor for localizing an object in an area based on the reflected signals by computing signatures using probabilistic macro-channels between the RFID reader and locations of the passive RFID tags. The transmitted signals form inputs to the probabilistic macro-channels, and the signatures form outputs from the probabilistic macro-channels.

17 Claims, 4 Drawing Sheets

SIGNATURE-BASED RFID LOCALIZATION

RELATED APPLICATION INFORMATION

This application claims priority to U.S. Provisional Application No. 62/655,153, filed on Apr. 9, 2018, incorporated herein by reference in its entirety.

BACKGROUND

Technical Field

The present invention relates to object detection and more particularly to signature-based Radio Frequency Identification (RFID) localization.

Description of the Related Art

Localization of objects can be used in different classes of applications from the localization of a single object, such as, for example, a bucket of rice at home, to finding the arrangement of many items such as books in a library, or performing inventory in a retail store. Such localization may even be used to track a shipment within a retail store or to track the path taken by an individual such as a customer or a store worker where the individual is carrying at least a Radio Frequency Identification (RFID) tag. Such tracking uses the localization engine as a primitive to build a time series which is then used to find the path in which the RFID tag is moving.

SUMMARY

According to an aspect of the present invention, a Radio Frequency Identification (RFID) localization system is provided. The system includes a set of passive RFID tags, each for reflecting transmitted signals. The system further includes an RFID reader for detecting the reflected signals by the passive RFID tags. The system also includes a processor for localizing an object in an area based on the reflected signals by computing signatures using probabilistic macro-channels between the RFID reader and locations of the passive RFID tags. The transmitted signals form inputs to the probabilistic macro-channels, and the signatures form outputs from the probabilistic macro-channels.

According to another aspect of the present invention, a method is provided for Radio Frequency Identification (RFID) localization. The method includes reflecting, by a set of passive RFID tags, transmitted signals. The method further includes detecting, by an RFID reader, the reflected signals by the passive RFID tags. The method also includes localizing, by a processor, an object in an area based on the reflected signals by computing signatures using probabilistic macro-channels between the RFID reader and locations of the passive RFID tags. The transmitted signals form inputs to the probabilistic macro-channels, and the signatures form outputs from the probabilistic macro-channels.

According to yet another aspect of the present invention, a computer program product is provided for Radio Frequency Identification (RFID) localization. The computer program product comprising a non-transitory computer readable storage medium having program instructions embodied therewith. The program instructions are executable by a computer to cause the computer to perform a method. The method includes localizing, by a processor of the computer, an object in an area, based on signals reflected from a set of passive RFID tags and detected by an RFID reader coupled to the processor, by computing signatures using probabilistic macro-channels between the RFID reader and locations of the passive RFID tags. The transmitted signals form inputs to the probabilistic macro-channels, and the signatures form outputs from the probabilistic macro-channels.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to signature-based Radio Frequency Identification (RFID) localization.

Figure 1:
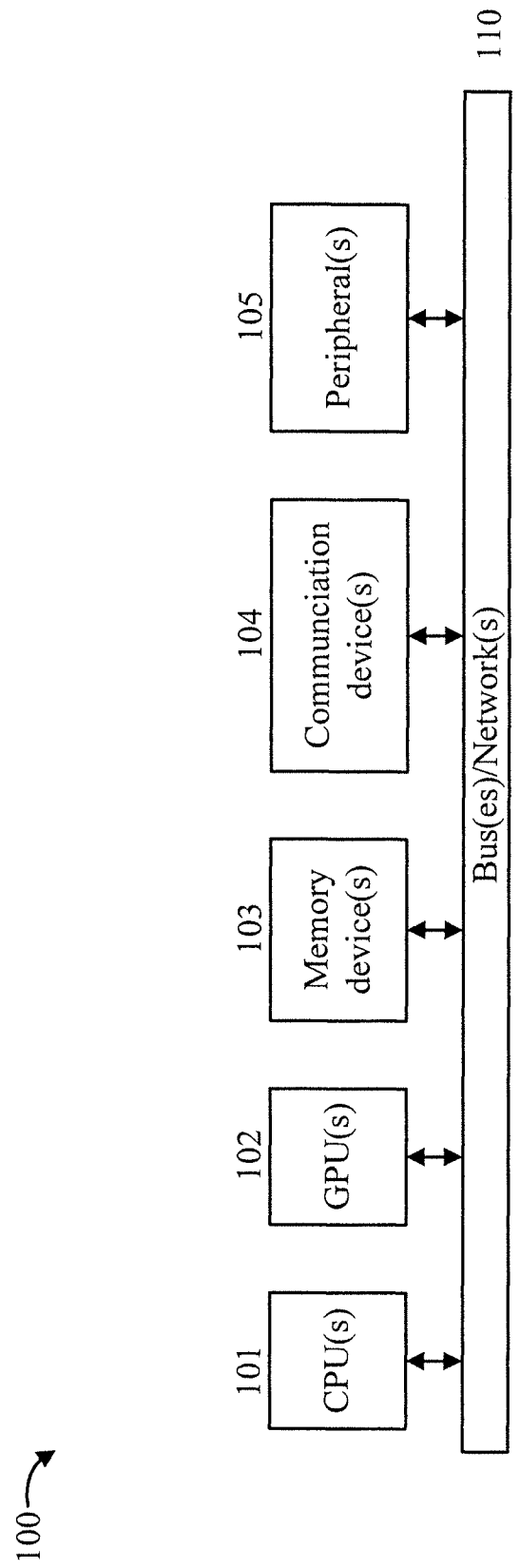
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100. Moreover, system 100 can be used to analyze results of the tagging and to perform actions responsive to tagging results. These and other uses of system 100 are readily determined by one of ordinary skill in the art given the teachings of the present invention provided herein, while maintaining the spirit of the present invention.

Figure 2:
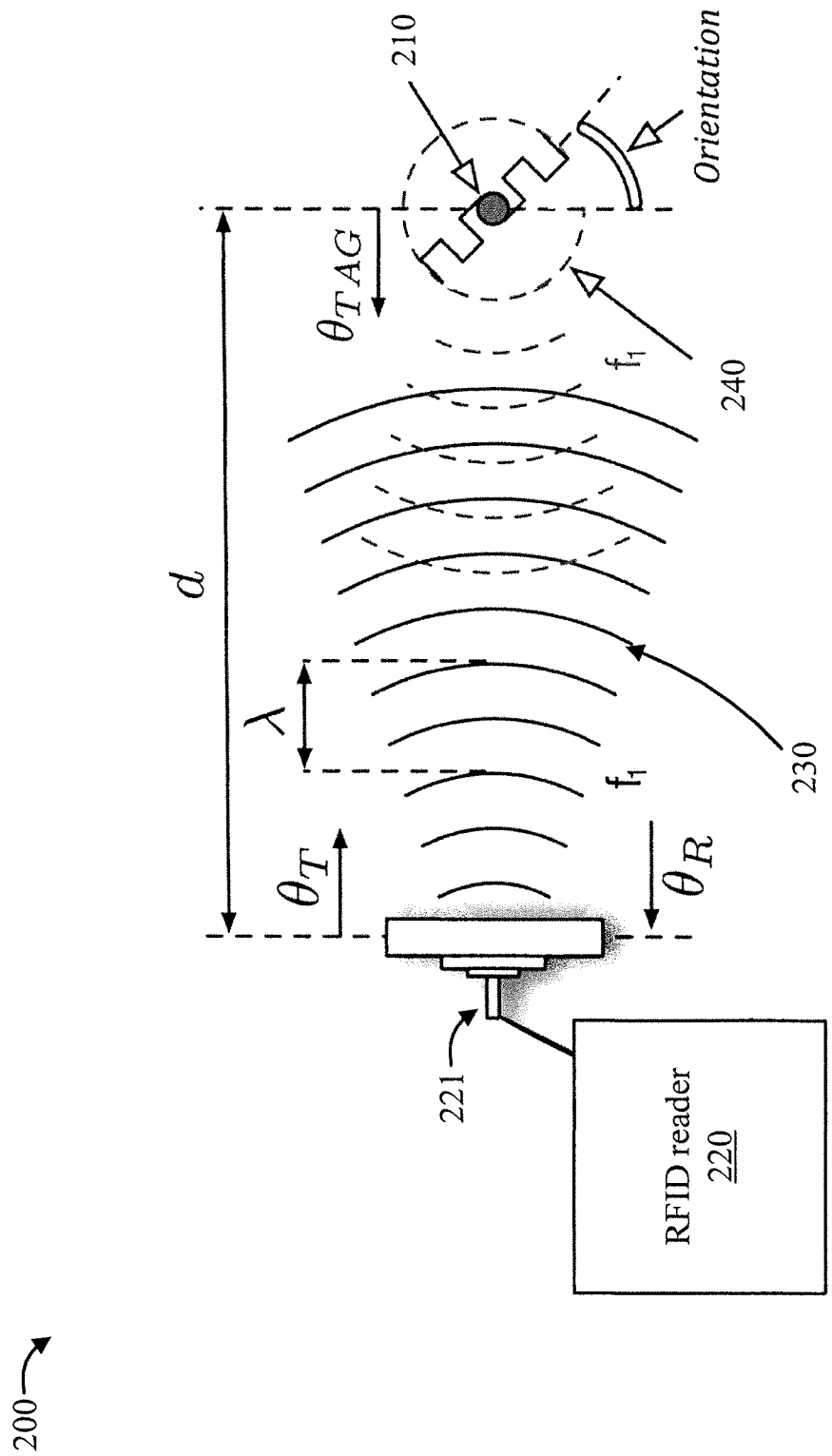
FIG. 2 is a block diagram showing an exemplary RFID backscattering mechanism to which the present invention can be applied, in accordance with an embodiment of the present invention.

FIG. 2 is a block diagram showing an exemplary RFID backscattering mechanism 200 to which the present invention can be applied, in accordance with an embodiment of the present invention.

The backscattering mechanism 200 involves a passive RFID tag 210 and an RFID reader 220 with an RFID antenna 221.

In FIG. 2, d denotes a distance between the RFID antenna 221 to the RFID tag 210, $\lambda$ denotes a wavelength of the transmitted wave 230, $\theta_T$ denotes the phase shift introduced by the transmit RF chain, $\theta_R$ denotes the phase shift introduced by the receive RF chain, "\theta_{TAG}" denotes the phase shift introduced by the tag, and $f_1$ denotes a frequency of the transmitted wave 230 and also of the backscatter wave 240.

In operation, a Radio Frequency (RF) wave 230 is transmitted from the antenna 221 of the RFID reader 220. Depending upon an orientation of the RFID tag 210, the RF wave 230 reflects the RF wave 230 back to the RFID antenna 221 as a backscatter wave 240. Moreover, by modulating the state of the reflected signal, i.e., the backscatter wave 240, the passive RFID tag 210 is able to convey information stored in the passive RFID tag 210.

While not shown, RFID reader 220 can be coupled to a computer processing system such as that shown in FIG. 1 in order to perform signature-based localization in accordance with the present invention.

Figure 3:
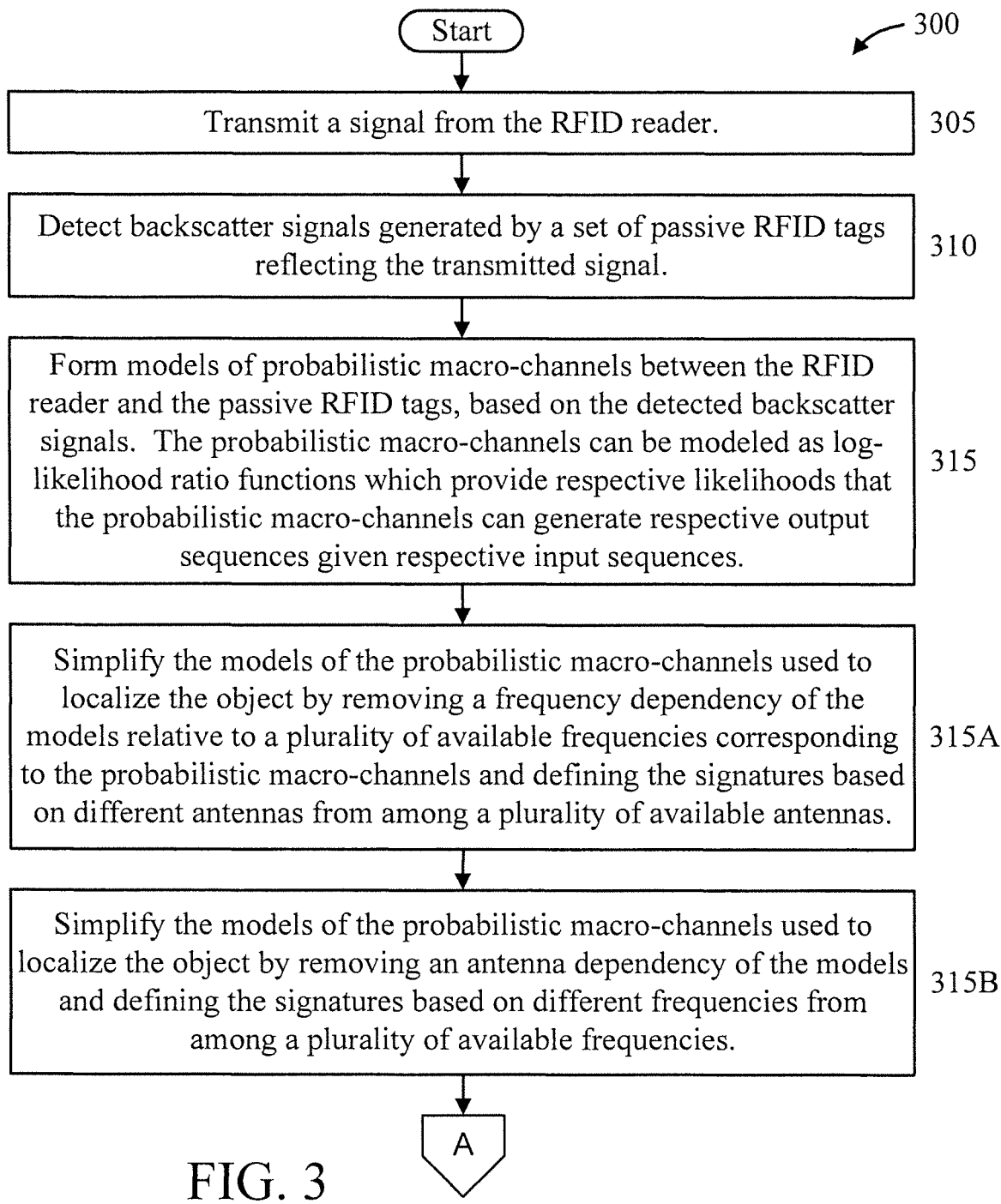
FIGS. 3-4 are flow diagrams showing an exemplary method for signature-based RFID localization, in accordance with an embodiment of the present invention.
Figure 4:
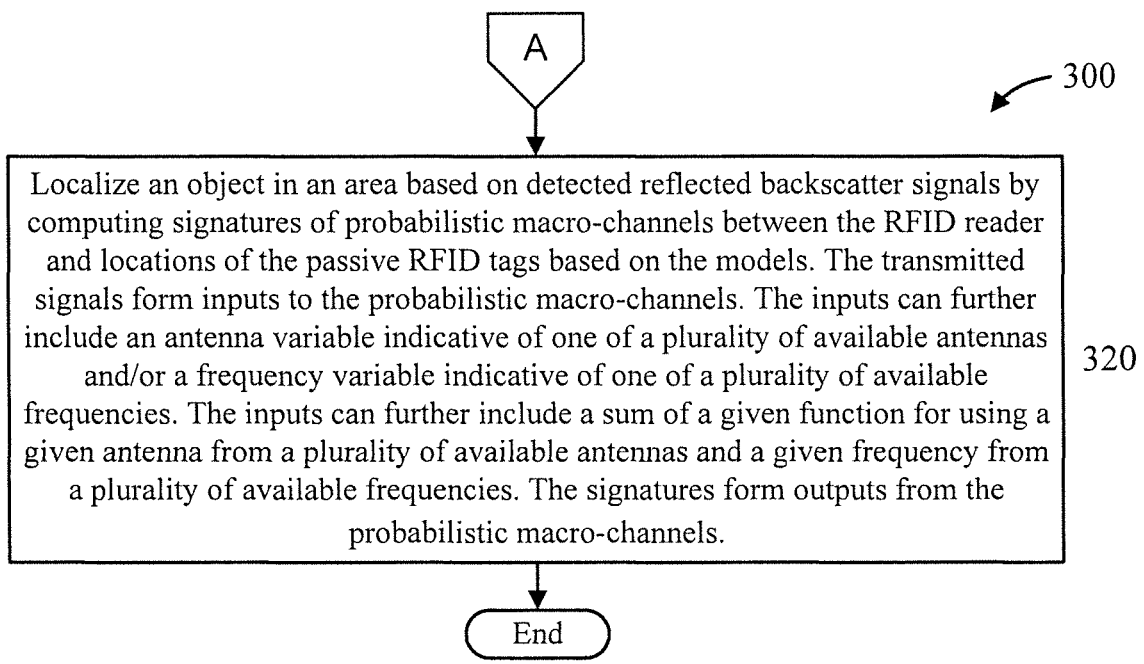

FIGS. 3-4 are flow diagrams showing an exemplary method for signature-based RFID localization, in accordance with an embodiment of the present invention.

At block 305, transmit a signal from the RFID reader.

At block 310, detect backscatter signals generated by a set of passive RFID tags reflecting the transmitted signal.

At block 315, form models of probabilistic macro-channels between the RFID reader and the passive RFID tags, based on the detected backscatter signals. In an embodiment, the probabilistic macro-channels can be modeled as log-likelihood ratio functions which provide respective likelihoods that the probabilistic macro-channels can generate respective output sequences given respective input sequences.

In an embodiment, block 315 can include one or more of blocks 315A and 315B.

At block 315A, simplify the models of the probabilistic macro-channels used to localize the object by removing a frequency dependency of the models relative to a plurality of available frequencies corresponding to the probabilistic macro-channels and defining the signatures based on different antennas from among a plurality of available antennas.

At block 315B, simplify the models of the probabilistic macro-channels used to localize the object by removing an antenna dependency of the models and defining the signatures based on different frequencies from among a plurality of available frequencies.

At block 220, localize an object in an area based on detected reflected backscatter signals by computing signatures of probabilistic macro-channels between the RFID reader and locations of the passive RFID tags based on the models. The transmitted signals form inputs to the probabilistic macro-channels. In an embodiment, the inputs to the probabilistic macro-channels can further include an antenna variable indicative of one of a plurality of available antennas. In an embodiment, the inputs to the probabilistic macro-channels can further include a frequency variable indicative of one of a plurality of available frequencies. In an embodiment, the inputs to the probabilistic macro-channels can further include a sum of a given function for using a given antenna from a plurality of available antennas and a given frequency from a plurality of available frequencies. The signatures form outputs from the probabilistic macro-channels.

A description will now be given regarding a RFID channel model and its properties, in accordance with one or more embodiments of the present invention.

The possibility of exciting an RFID tag and receiving a response from it is a function of multiple factors that will be discussed shortly in this section. However, even when all such factors remain stationary the response in a particular time is still exhibit a probabilistic behavior. This can be viewed as macroscopic effect of the channel between the interrogator and the RFID tag and reciprocal channel from the tag to RFID reader. As the signal and transmitted symbols in such channel follows a probabilistic model, due to the short transmission time and codewords used for transmission, the channel for such short transmission time period remains probabilistic.

The response from an RFID tag is usually a fixed response that includes the tag ID and in some cases extra information that is stored in the tag memory as well as the possible indication of an action. Such indication for example includes the confirmation of a write operation when an interrogator attempts to write into an RFID memory. The tag ID itself is usually written in a memory that can be accessed by an interrogator and can be replaced. Most actions are usually followed by a confirmation message from the RFID with the exception of the tag disable command which makes the tag unresponsive to all future reading attempt.

Since the response from the tag is fixed, for the purposes of the present invention, a "macro-channel" is defined between an RFID reader and RFID tag as a probabilistic channel where the channel input is a transmitted message from the reader (possibly from one antenna or a combination of multiple antennas) and the channel output is the received signal at the reader from the backscattered signal by the tag. The term macro-channel is used to distinguish this channel definition and its abstraction from the usual communication channel between the transmission chain of the reader and the tag and back from the tag to the receiver chain of the reader which is referred to herein by the term "micro-channel" to denote that this is the underlying channel. The macro-channel inherit some of its properties from the micro-channel. This means that a change in the micro-channel likely affects the transition probabilities of the macro-channel as well. Hence, any factors that affect the micro-channel naturally affect the macro channel as well. However, there are other attributes and conditions that affect the macro-channel while the micro-channel is independent of them.

For example, the number of tags in a vicinity of a particular tag affect the tag response time and possibly other attributes of the signal. This is not only due to possible reflection of a tag as a completely passive part. The fact that even a passive RFID tag is capable of transmitting a signal (backscattering) makes it an active element with respect to the transmission field and, for example, collision of such transmissions from multiple tags at particular time frame affects the reception of either signals at the interrogator.

Hence, the macro-channel not only inherits some of its properties from the micro-channel, other factors such as RFID protocols, number of tags, etc. also affect the transition probability of the macro-channel.

The macro-channel between a reader and a tag is formally defined herein below where different representations of the channel are described as a continuous channel (continuous time and continuous alphabet channel) and a discrete memoryless channel that is discrete in time but may be represented with a continuous alphabet or a discrete alphabet.

In an abstraction of the channel as a continuous channel, the channel input not only depends on discrete values such as transmitted codewords but also depends on some continuous parameters such as input power and the output of the channel not only includes a "0" for no response received from the tag and a "1" for a response from tag, and also includes some continuous attributes of the received signal such as received signal strength (RSSI), phase, phase shift between the received signal and transmitted signal, and/or doppler.

In a different abstraction of the channel, we use a slotted time system, where the transmission in each time slot is considered one use of the channel as a discrete memoryless channel. In this case, the transition probability of the channel is discrete in time, but may still depends on some continuous variables in the input or output in which case the alphabet is continuous.

A third and most simplistic form of the channel representation is where a fixed transmission parameter is used and only the reception of the response from the tag is considered as an output. As discussed herein, the transition probabilities still depends on which antenna port is used by the reader to excite the tag in this case. Hence the transition probabilities may be represented as transmission of different discrete alphabets where each alphabet denotes a particular antenna (or combination of antennas) as the channel input and the reception of a response from the tag constitute the channel output by defining a "0" for no response received from the tag and a "1" for a response from the tag'. Of course, the transition probabilities for different transmitted symbols may be different and in practice depending on the placement of the antenna and tag they are quite different.

A description will now be given regarding a tag type, in accordance with one or more embodiments of the present invention.

Different types of the tag have different response behavior which is a function of the design and size of the tag antenna and the chipset used in the tag. In particular some tags require less excitation power or have better sensitivities while modulating the backscatter signals. This means such tags are usually simpler to excite and receive a response back. The size and design and marching of the antenna to the chipset is also important factor in harvesting the energy. The tag antenna also has a particular pattern that affects its ability to receive and backscatter signals in different directions.

A description will now be given regarding environmental effects, in accordance with one or more embodiments of the present invention.

The response from an RFID tag is obviously depends on the channel between the interrogator and the tag and this channel is function of environmental factors. Hence the relative distance of the tag to the interrogator, the position of the tag with respect to other RF reflectors and absorbers, and the number and relative position of other RFID tags are some of important environmental factors.

A description will now be given regarding the distance between the tag and the interrogator as an environmental effect, in accordance with one or more embodiments of the present invention.

As the signal is transmitted through the air it decays in amplitude due to 3 dimensional expansion of the waves and other factors. Therefore, the distance between the tag and the RFID reader affects the transition probability of the macro-channel. This is in effect the same phenomenon that happens in a wireless fading channel or Gaussian channel. Since passive RFID tags directly use backscatter modulation the effect of the Gaussian noise only appears at the receiver of the RFID reader itself and there no noise amplifications due to reception of the signal at the tag. Therefore, the channel may be modeled as usual AWGN channel or by considering the effect of fading or multi-path as a fading channel with additive white Gaussian noise.

A description will now be given regarding tag position as an environmental effect, in accordance with one or more embodiments of the present invention.

Not only the distance between the tag and RFID reader, but also the actual position of the Tag and reader antennas affect the distribution of the macro-channel. It should be noted that even the wave propagation in the cables that connect the antennas to the reader and other RF connectors and devices in between also contribute to the macro-channel model. This means that even if the antenna position are fixed, the mere change of a cable or connector may require us to perform new measurement in order to find the correct macro-channel model.

A description will now be given regarding reflectors and absorbers as environmental effects, in accordance with one or more embodiments of the present invention.

The reflectors and absorbers in the wave propagation path between the interrogator and the tag also contribute to the transition probability of the macro-channel by generating multi-path. This happens due to the change in the micro-channel between the reader and the tag similar to fading and multi-path effect in other wireless communication systems.

A description will now be given regarding the number of tags in reading range as an environmental effect, in accordance with one or more embodiments of the present invention.

If more than one tag respond in a particular time or the response from at least two different tag overlap in time, the reader may not be able to correctly decode the response from either one. This situation is more likely to happen as the number of tags in the reading range of an interrogator increases. Although there might be techniques to decode the packet in presence of interference from other tags particularly separation of the tag response in space using multiple antennas but the of such technique is not widespread and requires costly equipment. In general, the number of tags in the reading range of an interrogator and their spatial distribution affects the transition probability of the macro-channel.

A description will now be given regarding RFID protocol, in accordance with one or more embodiments of the present invention.

The RFID protocol can have a particular provision to avoid collisions. There are other types of collision reduction or collision avoidance also proposed in prior work and may have been used by different commercial readers. These types of collision avoidance usually works in higher layers than the physical layer or mac layer of the RFID protocol and for example include techniques like tree-walking algorithm or ways to split the search space based on some prior or adaptive knowledge of the collection of the RFID tag EPCs. Obviously, the transition probability of the macro-channel would be affected by any of such algorithm as well as the provisioned collision avoidance in RFID Gen II standards.

A description will now be given regarding tag orientation, in accordance with one or more embodiments of the present invention.

Different orientation of the tags in three dimensional space causes the tags antenna to absorb different amount of energy since its antenna pattern as well as the propagation direction and polarization of the signal from the interrogator would be different at different locations.

The backscattered signal from the tag would also be affected by the antenna pattern of the tag as well. Hence, the tag orientation affects the micro-channel as well as the macro-channel.

A description will now be given regarding an antenna port, in accordance with one or more embodiments of the present invention.

The antenna port is defined by the signal that is transmitted from a given antenna or given combination of antenna elements. A different antenna port would result transmission of the signal from different combination of the antenna elements with particular gain. These antenna combinations define different micro-channels which in turn translate to having different macro-channels.

A description will now be given regarding multiple excitation from different sources (e.g., antennas), in accordance with one or more embodiments of the present invention.

In case that there are more than one reader, the excitation of the tag by different sources affects its ability to respond in particular time slot. This could be considered as an interfering signal that causes the tag to backscatter signal at different time and with different signal properties. This phenomenon does not affect the micro-channel between an RFID system and the tag, but it directly affects the macro-channel.

A description will now be given regarding multiple excitation in different frequencies, in accordance with one or more embodiments of the present invention.

Even if the interfering transmission is not in the same frequency, the excitation of an RFID in a given frequency affects its ability to respond to another frequency. Hence, the presence of interfering signal in different frequency affects the macro-channel transition probabilities while the micro channel is not affected by such interfering signal.

A description will now be given regarding excitation power, in accordance with one or more embodiments of the present invention.

In some abstraction of the macro-channel the excitation power that is the transmitted power by the RFID reader system is considered part of the definition of the macro-channel and hence the transition probability of the macro-channel is the function of excitation power in such cases.

A description will now be given regarding tag movement, in accordance with one or more embodiments of the present invention.

Obviously the tag movement affects the micro-channel and hence the macro-channel as well. Nonetheless, the movement of the tag affects the macro-channel in a completely different way as well. In some scenarios, the tag is not even readable if it is stationary, e.g., due to the fact that it is placed in a null point which means that the tag cannot absorb enough energy to be exited. However, the movement of the tag makes the tag to go out of such null region and/or absorbs more energy and hence starts the reply process and backscattering the signal. Therefore, the macro-channel is not only affected by the tag movement due to the change in micro channel, it is also affected due to the process of excitation of the tag itself.

A description will now be given regarding excitation frequency, in accordance with one or more embodiments of the present invention.

The micro-channel as well as the tag antenna pattern and backscattering mechanism is frequency dependent which makes the macro-channel to be frequency dependent as well.

A description will now be given regarding a micro-channel model and its transition probabilities, in accordance with one or more embodiments of the present invention.

A macro-channel model is defined herein by explicitly describing its transition probabilities. First, we will consider the most-simple abstraction of the macro-channel model as a discrete memoryless channel with transition probability f (y|x) where the channel output y takes its value from the set $\{0, 1\}$) and the channel input takes its value from the set $(a_1, a_2, \ldots, a_N)$ for an RFID system comprising of N antenna ports. Please note that the antenna port in this context may be feed multiple antennas simultaneously, for example, as a phased array antenna, or it may be used to drive to a single physical antenna element.

The transition probability f $(y_j|x_i)$ represents the conditional probability that the channel output $y_j$ is received when $x_i$ is the channel input. Hence it represents the case that the tag reception is $y_j$ while in this time slot the antenna $x_i$ is excited.

A more sophisticated case is where the macro-channel is still used in discrete time (an slotted time in practice), but the channel uses a continuous input alphabet, a continuous output alphabet, or both. The macro-channel transition probabilities may be defined as f(y|(u, v)) where the channel output y takes its value from the set of real numbers R or a limited interval of the real numbers. The channel input x=(u, v) is explicitly define using two variables u and v, where u is a discrete variable that takes its value from the set $\{a_1, a_2, \ldots, a_N\}$ that represent picking a particular antenna, e.g., $a_j$, for an RFID system comprising of N antenna ports as well as a continuous variable v that takes its value from the set of real numbers R or a limited interval of the real numbers.

Since the tag response is frequency dependent as well, one may extend the definition of the macro-channel transition probabilities as f(y|(u, w, v)) where the channel output y takes its value from the set of real numbers R or a limited interval of the real numbers. The channel input x=(u, w, v) is then a function of three variables u, w and v, where u and v are defined as previous case and w takes its value from a finite set of frequencies $\{w_1, w_2, \ldots, w_f\}$.

A useful example of discrete memoryless abstraction of the channel transition probabilities with continuous alphabet is where the received signal strength (RSSI) is considered as the received continuous variable and the transmit power is considered as the transmit continuous variable. The channel with analog white Gaussian noise is then represented as $$f(y \mid x, v) = \begin{cases} \frac{1}{\sqrt{2\pi\sigma_x^2}} e^{\frac{-(x-\eta v)^2}{2\sigma_x^2}} & \text{if response received} \\ 0 & \text{if no response recived} \end{cases} \quad (1)$$

where $\sigma_x$ represents the noise variance for the transmission from antenna x and $\eta$ is a constant factor that represents the total path loss from antenna port x to the tag and back from the tag the antenna port x.

The modeling of the channel with continuous time adds even more sophistication to the problem formulation. However, it is then needed to be used with a particular input signal design that eventually transfer the channel into a discrete-memoryless form.

A description will now be given regarding transition probability of a channel in a neighborhood, in accordance with one or more embodiments of the present invention.

In this section we touch upon the fact that for most practical system the transition probability of the channel is somewhat a continuous function in a three dimensional space. This means that the property of the macro-channel in a neighborhood around a given point in space is usually similar. For example, with respect to each transmitted symbol x (equivalently transmission from a given antenna x) the transition probability only varies with $\eta$ that is a continuous function of distance.

Nonetheless, if multiple antennas are used the combined effect of the antennas may cause $\eta$ to vary much more rapidly than the regular path loss in free space channel or with given Rayleigh or Rician fading channels. This abrupt change is usually more pronounced in near field where the effect of transmission from multiple antennas generates deep fades that are regions of very low power (also referred to as null points).

However, when antenna ports are used to derive single antennas, the change in the path loss parameter $\eta$ is much smoother and hence the assumption that the channel has almost similar behavior in a small enough neighborhood is usually valid.

A description will now be given of a problem formulation, in accordance with an embodiment of the present invention.

Using the definition of macro-channel, we formulate the problem as transmitting a codeword $x^n$ that consists of n use of the channel represented as n-tuple in the form of $(x_1, x_2, \ldots, x_n)$ and observing the output $y^n = (y_1, y_2, \ldots, y_n)$ in order to find what channel is more likely to be associated with this observation.

The process of finding the most likely channel may be formulated as finding which pair of $(x^n, y^n)$ is jointly typical over a set of channels $f_i(y|x)$, $i=1,2,\ldots,M$ for a finite set of such channels. As the codeword length grows large such joint typical decoding would incur diminishing error if the channel transition function are distinct.

It is noted that the problem of finding the location of the tag is identical to finding which channel is more likely to generate the output yn given the channel input is $x^n$.

The distance between the distributions of the channel probability may be given by Kullback-Leibler divergence (KL distance) defined as $$d_{KL}f_i^n, f_j^n) = -\sum_{y^n} f_i(y_k^n \mid x^n) \log \frac{f_j(y^n \mid x^n)}{f_i(y^n \mid x^n)} \quad (2)$$

The larger the distance between the pairs of the channel transition probabilities the faster the convergence of the decoding algorithm as the codeword length grows large.

It can be seen that the KL distance is a function of the chosen codeword $x^n$ for the transmission. This means that to optimize the system, one should pick up the transmit codeword that maximizes the minimum KL distance among all pair of channels of interest.

The fact that channels in a neighborhood have almost similar behavior may be used to only concentrate on a finite set of channels. The lower the number of the channels in the channel set $f_i(y|x)$, $i=1, 2, \ldots, M$, the easier the maximization of the KL distance.

Hence, it is easier to use smaller codeword to find the correct channel. In other words, there is less time used to transmit from different antennas to find the location of the tag.

However, at the same time, the lower the number of the channels in the channel set $f_i(y|x)$, $i=1, 2, \ldots M$, the lower the resolution of the decoding algorithm in finding the actual position of the tag.

It should be pointed out that as long as the KL distance is not zero, there is a guarantee that for long enough codewords all channels are distinguishable which means that the tag location can be identified within the partitioning that is done based on the resolution of the channels in the channel set $f_i(y|x)$, $i=1, 2, \ldots M$.

In order to increase the KL distance for a finite set of the channels, it is possible to use different channel attributes. For example, one may use RSSI and define the macro-channel transition probabilities as in Equation (1).

A description will now be given regarding a methodology for signature-based RFID localization, in accordance with one or more embodiments of the present invention.

Typically, joint decoding is difficult in practice. That is why in a communication channel one resorts to the use of linear codes with finite codeword length. The same may be applied in decoding process for the problem herein before.

One can use a log-likelihood ratio (LLR) type function that is additive and provides a likelihood of a channel that can generate the output sequence $y^n$ given that the input sequence $x^n$ is used for transmission. Let us consider the channel with continuous output RSSI and input $x=(u, w, v)$ that includes three variables u, w, and v where u is a discrete variable that takes its value from the set $(a_1, a_2, \ldots, a_N)$ that represent picking a particular antenna, e.g., $a_j$, for an RFID system comprising of N antenna ports as well as a continuous variable v that takes its value from the set of real numbers R or a limited interval of the real numbers and w that takes its value from a finite set of frequencies $\{w_1, w_2, \ldots, w_F\}$.

A simple LLR type function for the received vector $y^n$ and transmit vector $x^n$ may be defined as $$\gamma(i,j) = \sum_{k=1}^{n} L(y_k) \mathfrak{T}(u_k = u_i, w_k = w_j) \quad (3)$$

for all $i=1, \ldots, N$ and $j=1, \ldots, M$, where $L(\cdot)$ is an individual LLR type function for the received symbol $y_k$, and $\mathfrak{T}(c)$ is an indicator function that has value 1 when the condition c in the argument of the function is true and otherwise it is zero. One can also consider an additional function $$\lambda(i,j) = \Sigma_{k=1}^{n} \mathfrak{T}\ (u_k=u_i,\ w_k=w_j,\ y_k \neq 0) \quad (4)$$

to complete the view of the LLR type function by knowing how many nonzero entries have contributed into γ(i,j). Obviously, an alternative function $$\dot{\lambda}(i,j) = \Sigma_{k=1}^{n} \mathfrak{T}\ (u_k=u_i,\ w_k=w_j,\ y_k=0) \quad (5)$$

may be used that has equivalent information due to the fact that the sum of λ(i, j)+λ̇(i, j) is known from the transmitted codeword as $$\lambda(i,j) + \dot{\lambda}(i,j) = \Sigma_{k=1}^{n} \mathfrak{T}\ (u_k=u_i,\ w_k=w_j,\ x_k \neq 0) \quad (6)$$

Equation (3) represent a sum of a given function of RSSI for using a given antenna and a given frequency while Equation (10) denotes the number of correctly decoded packets for a using a given antenna and a given frequency. One can for example simplify the function L(·) to be an identity function, which means Equation (10) denotes the number of read by an antenna at a given frequency and Equation (3) divided by the value Equation (10) for the same frequency and antenna port represents the mean of the RSSI value. One can modify the functions to for example consider the median of the RSSI values and so on.

The values γ(i,j), λ(i,j),1≤i≤N, 1≤j≤M} are called the signature of the transmitted codeword $x^N$ at location P that is computed for the transition probabilities corresponding to the case that the tag is placed at location P. This can equivalently be called the signature of the corresponding macro-channel for the tag placed at point P or the signature of the received vector $y_N$ when the tag is placed at point P.

The signature may be simplified by removing the dependency on the frequency and redefining $$\lambda_A(i) = \Sigma_{k=1}^{n} L(y_k) \mathfrak{T}\ (u_k=u_i) \quad (7)$$

$$\lambda_A(i) = \Sigma_{k=1}^{n} \mathfrak{T}\ (u_k=u_i,\ y_k \neq 0) \quad (8)$$

for all i=1, . . . , N.

In yet another variation, one may remove the dependency of the antenna ports and just define the signature based on different frequencies as $$\lambda_A(i,j) = \Sigma_{k=1}^{n} L(y_k) \mathfrak{T}\ (w_k=w_j) \quad (9)$$

and $$\lambda_A(i,j) = \Sigma_{k=1}^{n} \mathfrak{T}\ (w_k=w_j,\ y_k \neq 0) \quad (10)$$

for all j=1, . . . , M.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A Radio Frequency Identification (RFID) localization system, comprising:
    a set of passive RFID tags, each of the passive RFID tags in the set for reflecting transmitted signals;
    an RFID reader for detecting the reflected signals by the set of passive RFID tags; and
    a processor for localizing an object in an area based on the reflected signals by computing signatures using probabilistic macro-channels between the RFID reader and locations of the passive RFID tags, wherein the transmitted signals form inputs to the probabilistic macro-channels, and the computed signatures form outputs from the probabilistic macro-channels,
    wherein the outputs from the probabilistic macro-channel at least comprise a received signal strength, an antenna port number, an excitation frequency, a phase shift between at least one of the transmitted signals and at least one of the reflected signals, and Doppler derived signal.

2. The RFID localization system of claim 1, wherein the probabilistic macro-channels are modeled as log-likelihood ratio functions which provide respective likelihoods that the probabilistic macro-channels can generate respective output sequences given respective input sequences.

3. The RFID localization system of claim 1, wherein the inputs to the probabilistic macro-channels further comprise an antenna variable indicative of one of a plurality of available antennas.

4. The RFID localization system of claim 1, wherein the inputs to the probabilistic macro-channels further comprise a frequency variable indicative of one of a plurality of available frequencies.

5. The RFID localization system of claim 1, wherein the inputs to the probabilistic macro-channels depend on discrete values of transmitted codewords in the transmitted signal and an input power of the transmitted signal.

6. The RFID localization system of claim 1, wherein the outputs from the probabilistic macro-channels selectively comprise a first binary value representing the presence of a response and a second binary value representing an absence of the response.

7. A method for Radio Frequency Identification (RFID) localization, comprising:
    reflecting, by a set of passive RFID tags, transmitted signals; and detecting, by an RFID reader, the reflected signals by the passive RFID tags;

localizing, by a processor, an object in an area based on the reflected signals by computing signatures using probabilistic macro-channels between the RFID reader and locations of the passive RFID tags, wherein the transmitted signals form inputs to the probabilistic macro-channels, and the computed signatures form outputs from the probabilistic macro-channels, wherein the outputs from the probabilistic macro-channel at least comprise a received signal strength an antenna port number, an excitation frequency, a phase shift between at least one of the transmitted signals and at least one of the reflected signals, and Doppler derived signal.

8. The method of claim 7, wherein the probabilistic macro-channels are modeled as log-likelihood ratio functions which provide respective likelihoods that the probabilistic macro-channels can generate respective output sequences given. respective input sequences.

9. The method of claim 7, wherein the inputs to the probabilistic macro-channels further comprise an antenna variable indicative of one of a plurality of available antennas.

10. The method of claim 7, wherein the inputs to the probabilistic macro-channels further comprise a frequency variable indicative of one of a plurality of available frequencies.

11. The method of claim 7, wherein the inputs to the probabilistic macro-channels depend on discrete values of transmitted codewords in the transmitted signal and an input power of the transmitted signal.

12. The method of claim 7, wherein the outputs from the probabilistic macro-channels selectively comprise a first binary value representing the presence of a response and a second binary value representing an absence of the response.

13. A computer program product for Radio Frequency Identification (RFID) localization, the computer program product comprising a non-transitory computer readable storage medium having program instructions embodied therewith, the program instructions executable by a computer to cause the computer to perform a method comprising:

localizing, by a processor of the computer, an object an area, based on signals reflected from a set of passive RFID tags and the signals detected by an RFID reader coupled to the processor, by computing signatures using probabilistic macro-channels between the RFID reader and locations of the passive RFID tags, wherein the transmitted signals form inputs to the probabilistic macro-channels, and the computed signatures form outputs from the probabilistic macro-channels, wherein the outputs from the probabilistic macro-channel at least comprise a received signal strength, an antenna port number, an excitation frequency, a phase shift between at least one of the transmitted signals and at least one of the reflected signals, and Doppler derived signal.

14. The computer program product of claim 13, wherein the probabilistic macro-channels are modeled as log-likelihood ratio functions which provide respective likelihoods that the probabilistic macro-channels can generate respective output sequences given respective input sequences.

15. The computer program product claim 13, wherein the inputs to the probabilistic macro-channels further comprise an antenna variable indicative of one of a plurality of available antennas.

16. The computer program product of claim 13, wherein the inputs to the probabilistic macro-channels further comprise a frequency variable indicative of one of a plurality of available frequencies.

17. The computer program product of claim 13, wherein the inputs to the probabilistic macro-channels depend on discrete values of transmitted codewords in the transmitted signal and an input power of the transmitted signal.

* * * * *